No. 686,444. Patented Nov. 12, 1901.
H. D. CRIPPEN, G. WHITE & G. S. MAXWELL.
ROCK DRILL.
(Application filed Dec. 31, 1900.)
(No Model.) 5 Sheets—Sheet 1.
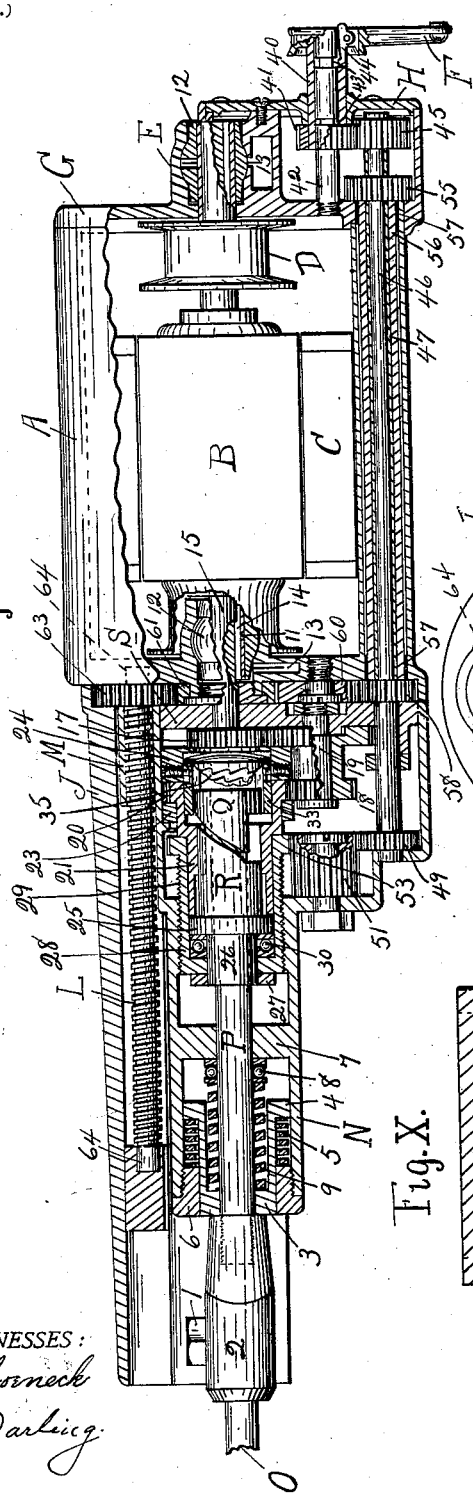
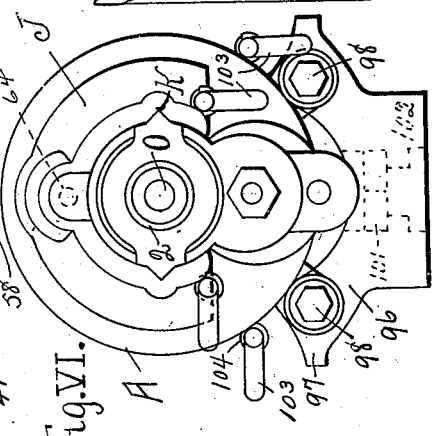
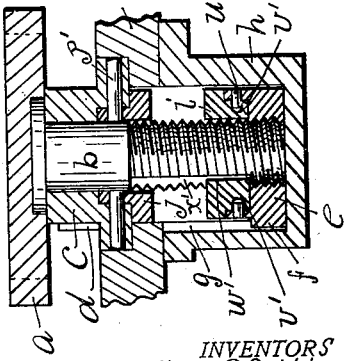
WITNESSES:
Cla Schorneck
E. L. Darling.
INVENTORS
Henry D. Crippen.
George White
BY George S. Maxwell
Alfred Wilkinson
ATTORNEY.

No. 686,444. Patented Nov. 12, 1901.
H. D. CRIPPEN, G. WHITE & G. S. MAXWELL.
ROCK DRILL.
(Application filed Dec. 31, 1900.)
(No Model.) 5 Sheets—Sheet 2.
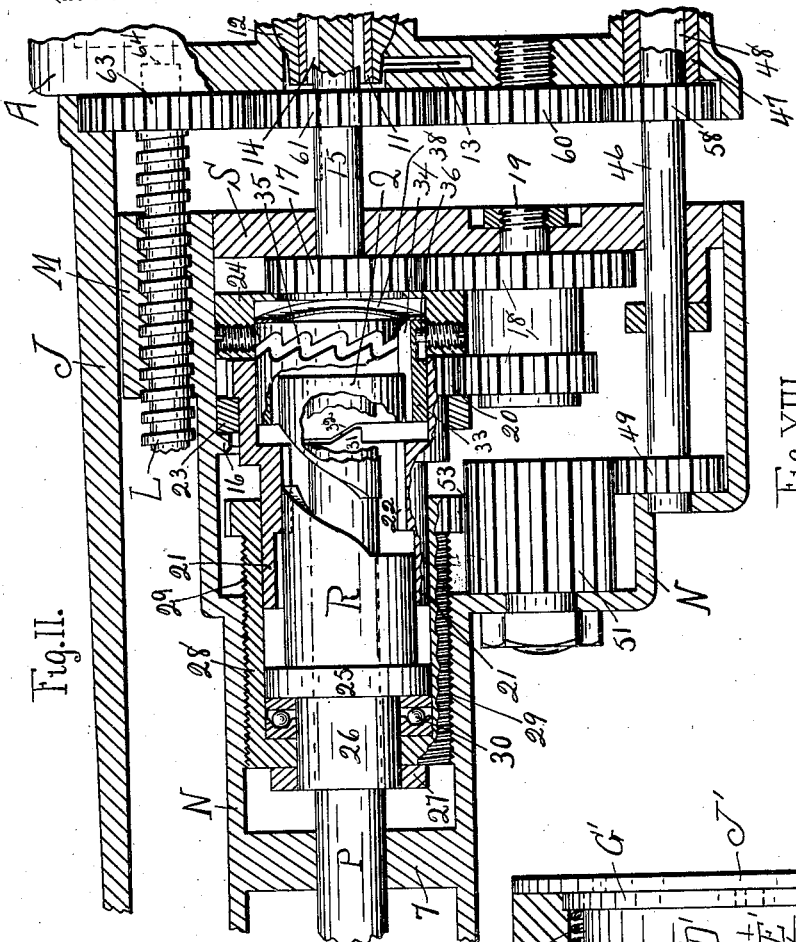
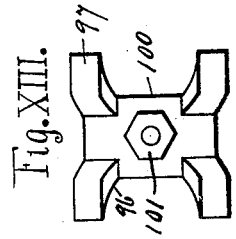
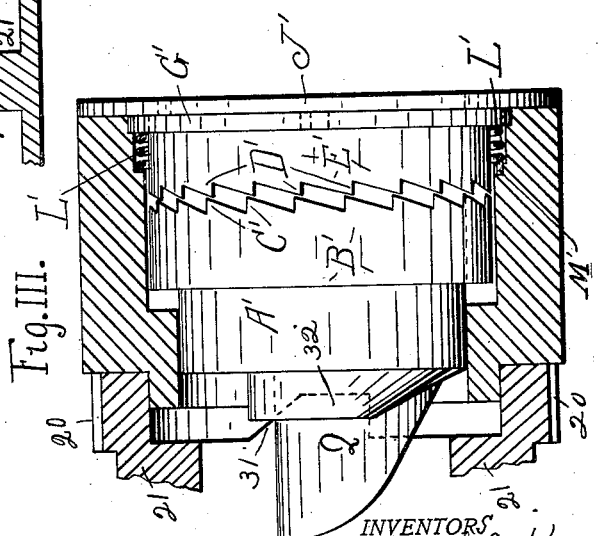
WITNESSES:
C. C. Schoeneck
E. L. Darling
INVENTORS
Henry D. Crippen
George White
George S. Maxwell
BY
Alfred Wilkinson
ATTORNEY.

No. 686,444. Patented Nov. 12, 1901.
H. D. CRIPPEN, G. WHITE & G. S. MAXWELL.
ROCK DRILL.
(Application filed Dec. 31, 1900.)
(No Model.) 5 Sheets—Sheet 3.
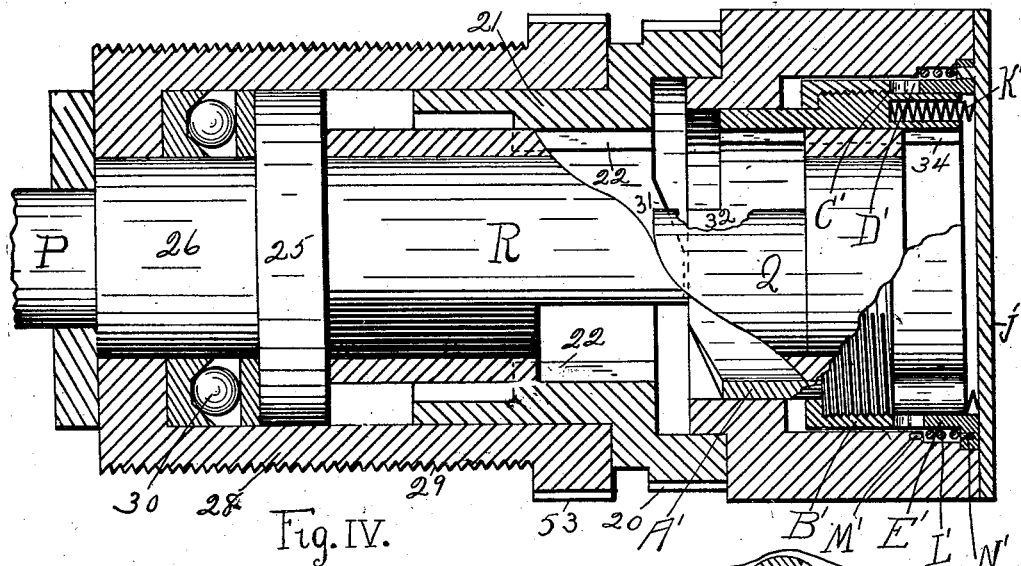
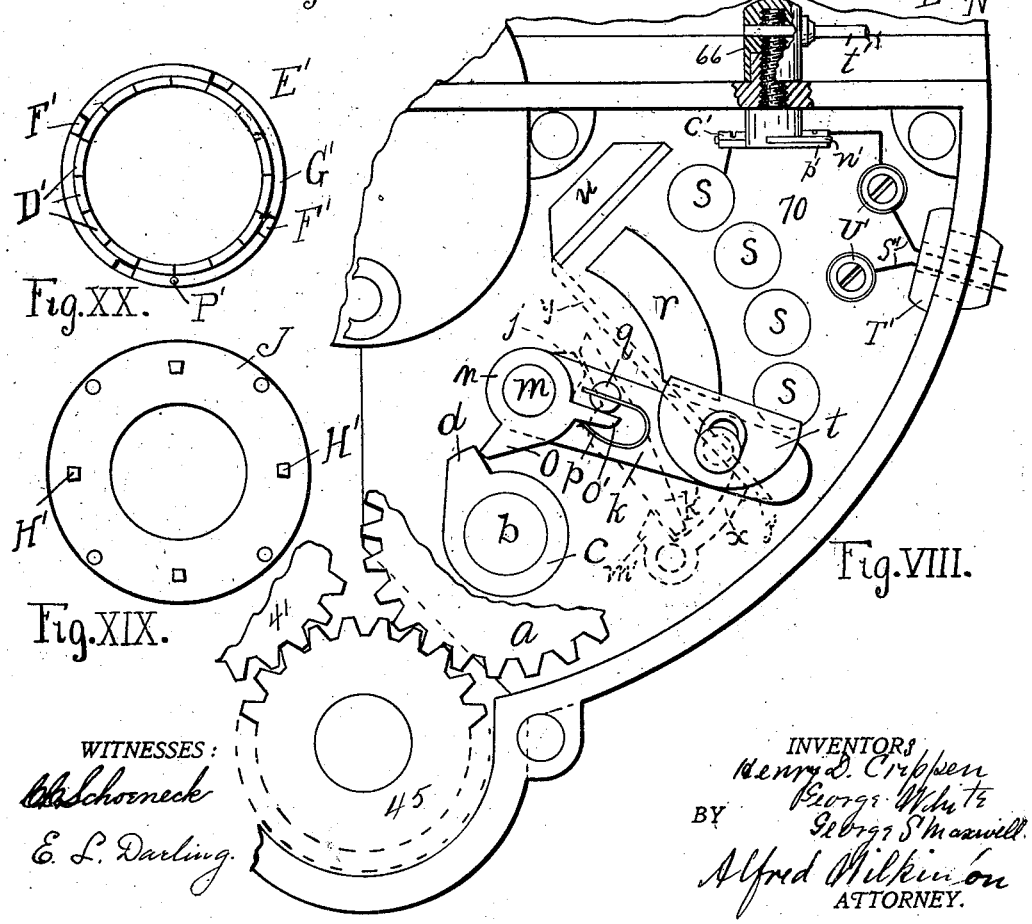
WITNESSES:
Ch Schoeneck
E. L. Darling
INVENTORS
Henry D. Crippen
George White
George S. Maxwell
BY
Alfred Wilkinson
ATTORNEY.

No. 686,444. Patented Nov. 12, 1901.
H. D. CRIPPEN, G. WHITE & G. S. MAXWELL.
ROCK DRILL.
(Application filed Dec. 31, 1900.)
(No Model.) 5 Sheets—Sheet 4.
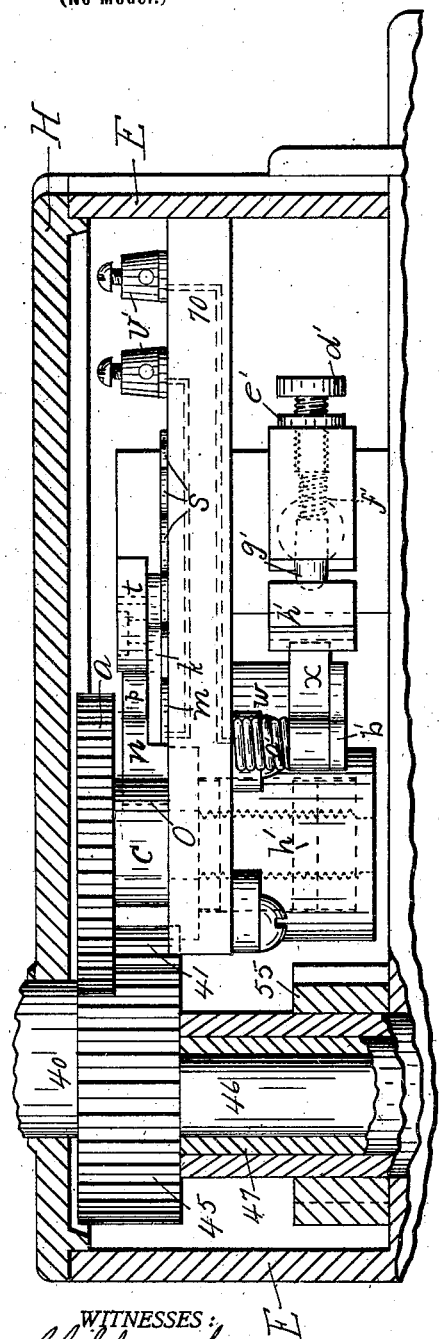
Fig. IX.
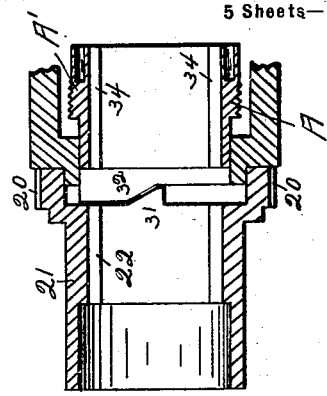
Fig. X.
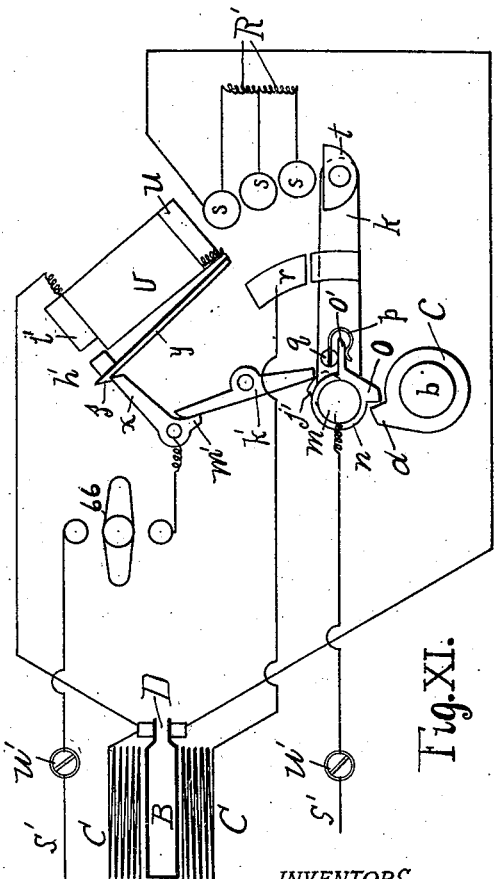
Fig. XI.
WITNESSES:
C. C. Schorneck
E. L. Darling
INVENTORS
Henry D. Crippen
George White
George S. Maxwell
BY Alfred Wilkinson
ATTORNEY.

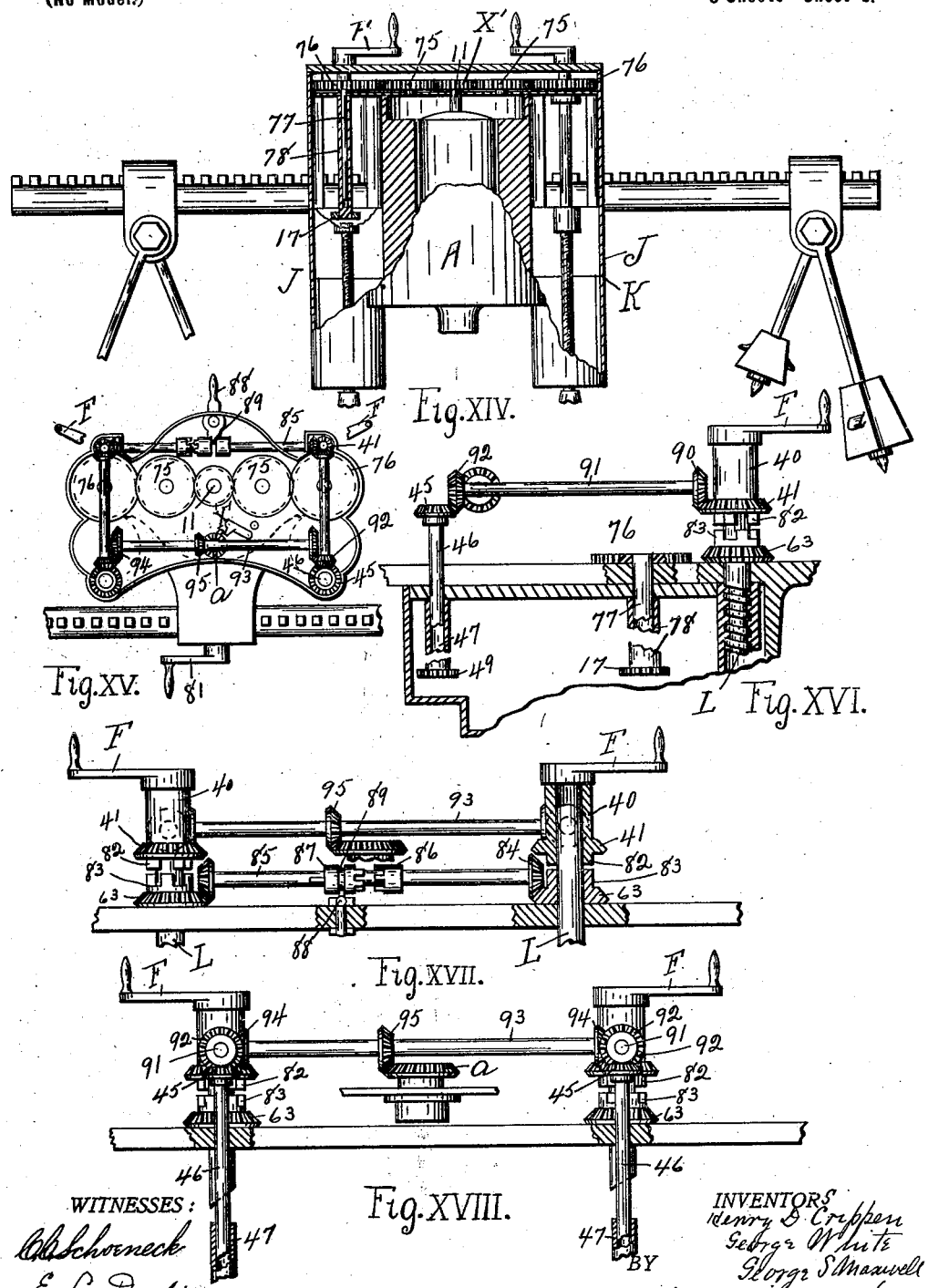

UNITED STATES PATENT OFFICE.

HENRY D. CRIPPEN, OF NEW YORK, N. Y., AND GEORGE WHITE AND GEORGE S. MAXWELL, OF JERSEY CITY, NEW JERSEY; SAID WHITE AND MAXWELL ASSIGNORS TO SAID CRIPPEN.

ROCK-DRILL.

SPECIFICATION forming part of Letters Patent No. 686,444, dated November 12, 1901.

Application filed December 31, 1900. Serial No. 41,551. (No model.)

*To all whom it may concern:*

Be it known that we, HENRY D. CRIPPEN, of New York city, county and State of New York, and GEORGE WHITE and GEORGE S. MAXWELL, of Jersey City, in the county of Hudson, in the State of New Jersey, have invented new and useful Improvements in Rock-Drills, of which the following, taken in connection with the accompanying drawings, is a full, clear, and exact description.

This invention relates to a rock-drill of the percussive type and is a unitary device complete in itself, with all the parts inclosed in a single compact case. It consists, essentially, of two elements, the motor element or motor and the drill element or drill, the motor maintaining a fixed position in the case, while the drill is fed independently on interior feedways formed in the case itself. This rock-drill is designed particularly for an electric motor, to which the current may be brought from any convenient distance through the usual line-wires. In any position of the drill element power is communicated thereto from the motor by a single positive variable connection, and all the vibrating and reciprocating parts are arranged entirely outside of the motor in a supplementary inclosing shell, so separated from the motor and yet inclosed and sustained in a portion of the main case. Thus neither the mechanical nor electrical operation of the motor is disturbed by vibration, shock, or by reciprocation of any parts between the field-magnets. By a simple adaptation of the parts a single motor may be combined to operate two drill elements in a single case, the drill elements being operated independently or together, simultaneously or alternately.

The important details of our rock-drill are the integral case inclosing the magnets and the suitably-journaled armature having an integral extension or extensions provided with ways for the drill element or elements comprising the bit, ram, spring or springs, operative cams, shells inclosing the respective cams, and means for rotating the bit a fixed distance at each stroke independent of the length of the stroke. A single crank is used, adapted in one position, through one set of connections, to vary the distance between the cams and to turn on the current at the proper time through a convenient arrangement of electrical connections, and in a second position, through a second set of connections, to feed the drill in and out. The complete rock-drill is suitably supported with a low center of gravity on a special base, insuring stability and permitting the bit to be removed conveniently without affecting the alinement. Most of these improvements may be used with other than electrical power.

Our invention is shown in the accompanying drawings, in which the same reference letters and numerals indicate the same parts in all the figures.

Figure I is a longitudinal section of our complete rock-drill, portions being shown in elevation and being broken away. Fig. II is a portion of Fig. I enlarged, showing the drill-shell fed forward a short distance and the main cams separated. Fig. III is an enlarged elevation of a portion of Fig. II, showing a preferred form of the mechanism for rotatably shifting the bit positively at each stroke. Fig. IV is a more extended view of same mechanism, showing parts in section. Fig. V is similar to Fig. IV, with the main cams removed. Fig. VI is a front elevation of the rock-drill, showing the handles. Fig. VII is a top plan view of a portion of the rear projection and the electric switch. Fig. VIII is a rear elevation of a portion of the rear projection with the lower plate removed to show the electrical switching mechanism. Fig. IX is a side elevation of the electrical mechanism shown in Fig. VIII, taken at an angle of about forty-five degrees and showing the inclosing shell and shafts in section and the lower plate in position. Fig. X shows in section the screw-stud and connected parts by which the contact-piece is shifted to turn on the current. Fig. XI is a diagram of the electrical switching mechanism. Fig. XII is a diagrammatic elevation of the rock-drill reduced, showing the base-plate and means for swinging the drill to one side or the other thereon to remove the bit. Fig. XIII is a top plan view of the base-plate. Figs. XIV to XVIII show a modification in form of our single rock-drill, in which by a simple variation of the parts and the addition of connections two drills or drilling elements may be combined with a single motor in one case. These figures do not show all of the parts in detail, but are substantially diagrams illustrating the changes in form and the new parts. Fig. XIV is a top plan view, with portions broken away, of the double drill supported on a quarry-bar of usual construction. Fig. XV is a rear elevation of the preceding view with the rear plate removed. Fig. XVI is a side elevation of Fig. XV. Fig. XVII is a top plan view of a portion of Fig. XV enlarged. Fig. XVIII is a corresponding bottom plan. Figs. XIX and XX are plans of parts relating to the bit-rotating mechanism.

*Inclosing case, motor, and drill.*—A is the main case or motor-case inclosing the motor, of which B is the armature, C C the field-magnets, and D the commutator.

E is a rear projection on the motor-case, forming a chamber for the mechanism through which the current is controlled from the crank F.

G is the upper plate, removable for repairing the motor, attaching the brushes, &c., and H the lower rear plate on the rear projection covering the mechanism in the chamber.

J is a part of the case and is an extension integral therewith or suitably secured thereto, and is provided with ways K K, on which is fed by the feed-screw L, engaging with nut M, the drill-shell N, carrying the bit O, the ram P, the ram-cam Q, the driving-cam R, and the other parts by which the bit is operated and its motion controlled.

S is the rear plate on the drill.

1 is the nut for securing the bit in the chuck 2, screwed to the outer end of the ram P against the hollow collar 3, keyed fast to the ram and having the flange 4, fitting the outer end of the drill-shell N. Within the drill-shell end is screwed the nut 6, serving as a bearing for the collar 3 as it oscillates with the ram and also as a seat for the weaker buffer-spring 5, retained between it and collar-flange 4. Between the collar and the septum 7, provided with an antifriction ball-bearing 8, if desired, for the turn of the bit, is arranged the main or percussive spring 9, alternately compressed by the action of the main cams as the ram and bit are retracted and expanding when the cams disengage to effect the blow or stroke of the bit.

By the following mechanism the driving-cam R is rotated against the ram-cam Q, fixed on the ram. 11 is the armature tubular shaft carried in bearings 12 12, capable of a certain amount of self-adjustment and having oil-wells 13 13 and oil-rings. To this shaft by elongated feather 14 is keyed the telescoping driving-shaft 15, rotating therewith, but feeding in and out as the drill-shell is fed forward and back. To shaft 15 is fixed pinion 17, meshing with intermediate quill-pinion 18 on stud 19, which meshes with gear 20 on driving-cam shell 21, keyed to its driving-cam R by feather 22, so that they rotate together; but the driving-cam is free to move longitunally within its shell a sufficient distance to permit the entire separation of the two cams when starting the drill to regulate the length of the stroke. The driving-cam shell 21 is retained against longitudinal movement by collar 23, resting against rib 16 of drill-shell, and escapement-ring 24, bolted to shell, and is provided with a shoulder 25 and shank 26, to which is fitted the nut 27, locking it to move longitudinally with the separating-shell 28, threaded to 29 to engage with the drill-case, on which it is moved in and out to separate the cams more or less. This separating-shell has the exterior gear 53, to be described. Within the separating-shell 28 rotates the driving-cam and its shell, ball-bearing 30 being interposed, if desired.

*Bit-rotating parts.*—To rotate the bit and shift the position of its cutting edge at each successive stroke, the driving-cam shell 21 is provided on its rear shoulder with the small cam 31, having one edge inclined, which engages at each rotation with small cam 32, having one inclined edge and an elongated face on ram-cam shell 33, which is rotatably connected by feather 34 to the ram-cam Q and is provided with the cam-groove 35, with which engages one or more pins 36, fixed in a fixed portion of the drill-case, such as the escapement-ring 24. At each rotation of the driving-cam R these small cams engage, by which the ram-cam Q is turned and would be continuously rotated, but that the ram-cam shell 33, rotating therewith, turns on the pins 36, in engagement with its cam-groove 35, and this groove being formed with a series of inclines the shell 33 is carried rearwardly by engagement of pin 36 with each incline a sufficient distance to disengage the small cams, when rotation of bit ceases and it is free to deliver a straight blow, the small cams being so arranged as to engage when the bit is retracted—that is, during engagement of inclined edges of main cams—when the spring is being compressed. The small cams should be arranged to disengage at the same time as the main cams. Thus at each rotation of the driving-cam the bit is rotated through a short arc of a length fixed by the number of inclines in the cam-slot 35, and the shift of bit is always constant and of a constant length of arc, whether the stroke be long or short. Spring 38 tends to force the ram-cam shell forward to insure engagement of these small cams.

The described bit-rotating mechanism is shown in Figs. I and II; but in Figs. III, IV, V, XIX, and XX is shown a similar but preferred form thereof. In this better form ram-cam Q is rotatably keyed as before by feather 34 to ram-cam shell 33, here made in two parts A' and B' (secured together firmly by thread and shoulders or other suitable means) for convenience in cutting inclined ratchet-teeth C', engaging with corresponding opposite ratchet-teeth D' on shifting shell E' (shown in plan in Fig. XX) and formed with notches F' on its rear flange G' to engage with slightly-smaller studs H' on some plate, as J', fixed in drill-shell and shown in Fig. XIX. Spring or springs K', arranged in sockets in part A' or in other suitable position, tend to force ram-cam shell 33 forward. Spring L' is arranged around shifting shell E', with ends M' and N' engaging, respectively, with drill-shell and shifting shell, as hole P', in flange. The operation is best shown in Fig. IV, where the main cams are about to disengage and ram-cam shell has been forced rearwardly by engagement of small cams 31 and 32, so that teeth C' engage with teeth D' and slide along their inclined edges, thus turning ram and bit a short distance. The engagement of the cams tends to turn the shells, which is stopped by the engagement of the teeth and notches F' on studs H' after shifting shell has been turned a short distance, and when shells and teeth disengage shifting shell is re-turned by spring L' to its normal position, turning the teeth D' back past teeth C' in position shown in Fig. III, where engagement is certain.

*Crank and connections.*—At the rear of the motor-case is journaled the crank F on the tubular crank-shaft 40, carrying pinion 41 on its inner end and fitted to stud 42, having grooves 43 43, with which engages latch 44 to lock crank in its out or in position. By means of this single crank in its out position the cams are separated before the motor can be started, thus guarding the motor against overloads at starting and blown fuses. The current is then gradually turned on through intermediate mechanism, to be described. The crank is then reversed to move the cams into engagement to a greater or less extent to regulate the length of the stroke. The crank is then moved into its in position to feed the drill through following connections: In out position of crank F pinion 41 engages with rear gear 45 on solid shaft 46, rotatably connected to telescoping tubular shaft 47 by elongated feather 48. Front gear 49, keyed fast to front end of tubular shaft 47, meshes with elongated intermediate gear 51 of such length as to mesh with gear 53 on separating shell 28 in any suitable position in which the latter may be adjusted forward or back in the drill-shell, carrying with it the driving-cam R. Having separated the cams by back turn of the crank and turned on the current by a continuous back turn, as here arranged, the crank is reversed to bring the cams into greater or less engagement, and thus regulate the length of the stroke from minimum to full stroke. The spring-latch is then released, the crank pushed in on stud 42, bringing pinion 41 into engagement with rear pinion 55 on outer tubular shaft 56 in bearings 57 57, and carrying front pinion 58 on front end, by which, through intermediate pinions 60 and 61, suitably supported, motion is transmitted to feed-gear 63 on feed-screw L, carried in fixed bearings 64 64 within motor-case and extension, by the engagement of which screw with nut M on drill-shell N the drill-shell and all the inclosed parts are fed forward or back independently of the motor.

*Current-controlling mechanism.*—In the chamber of projection E is arranged parallel to the plate of the motor-case a supporting-plate 70, of slate or other insulating material, carrying the electrical connections and controlling mechanism. In this base-plate is journaled a fiber-gear $a$, meshing with gear 45 and fixed on screw-stud $b$, on which is fitted to turn freely the fiber clutch-collar $c$, having the pawl $d$ and clutch member $j$ pinned to it by pin $z'$. Fitted to the screw-stud $b$ is the clutch-nut $e$, moving on the screw-stud $b$ as it is turned by its gear $a$, but prevented from rotating by feather $f$ engaging in spline $g$ in guard-case $h$, secured to base-plate 70, and to clutch-nut $e$ by pins $u'$ $u'$ engaging in groove $v'$ is the opposite clutch member $i$, having feather $w'$ engaging with spline $x'$ on stud $b$, so as to turn freely on clutch-nut and rotate with stud to turn clutch-collar $c$ when the clutch members engage. These clutches are preferably metallic and insulated. When gear $a$ has been rotated a certain number of times in a rearward direction, as here shown, the clutch-nut $e$, moving along the screw-stud $b$, will force the clutch member $i$ into engagement with the clutch member $j$, causing the clutch-collar $c$ to rotate with the screw-stub $b$ and by its pawl $d$ to operate the switch-lever or contact-piece $k$ to close the circuit. The threads on screw-stud $b$ are so proportioned to the threads 29 on separating-shell 28 and to the connecting-gears that the pawl $d$ is only operated to move the switch-lever or contact-piece when the driving-cam R is in forward position and entirely free from the ram-cam Q to prevent overload, &c., before armature speeds up, as before stated. The switch-lever is fixed on its shaft $m$, on which is journaled the pawl-collar $n$, having the integral pawl $o$, held in position by spring $p$ and lug $q$ on switch-lever $k$. When pawl $d$ is rotated from right to left it snaps past cam $o$, but when rotating in the opposite direction it engages therewith and forces a second cam $o'$ on cam-collar $n$ against the projection $q$ on switch-lever $k$ and moves the switch forward, making contact between terminal $r$ and the successive terminals $s$ $s$ $s$, cutting out in succession the armature-resistance coils R' R'. When the switch has reached its limit of movement, the soft-iron block $t$, which is pivoted loosely to its end, is brought into contact with the pole-piece $u$ of the electromagnet $v$ and is held there so long as the electromagnet $v$ is energized. Should the current be cut off from this electromagnet, the soft-iron block $t$ is not attracted and its switch is not turned to its original position by the spring $w$ on the switch-lever shaft m, thus cutting off the current from the motor. The current to magnet v includes in its circuit pawl x and spring-latch y, having catch z, engaging with pawl x, which is forced outwardly by the spiral spring a', arranged on its journal b', as shown in Figs. IX and XI.

The magnet v may be adjusted by means of the screw d', jam-nut e', tension-spring f', and plunger g' to allow only a certain amount of current to pass through the magnet. Should a greater amount pass, the magnet v will be more highly energized, the resistance of the spring f' will be overcome, and the armature h' on the spring-catch y will be drawn toward the pole-piece i'. This will release the catch z from engagement with the pawl x out of contact with the spring-catch y, breaking the circuit, and thus stopping the motor. The switch-lever k, turning to its original position, rotates the lug j' on the switch-lever shaft into engagement with one end of the insulated rocking lever k, whose opposite end engages a lug m' on pawl x, turning it back to engage with catch z on the spring-catch y, thus closing the circuit from the electromagnet v when it is again desired to start the motor.

Any suitable switch 66 may be used for turning on or quickly turning off the current and stopping the motor, arranged in any convenient position on one side of projection, as shown in Fig. VII, where spool for resistance-coils may be secured below it or on the other side, as in Fig. IV. t' indicates its handle, n' its blade, and c' p', respectively, its two terminals.

The line-wires S' S' are introduced through a convenient bushing T' to binding-posts U', thence to shaft m of switch-lever and to journal b', thence through supplementary magnet and contacts to brushes, resistance-coils R' R' being arranged between contacts s s s.

Any suitable means and connections may be used to turn on the current when our drill is operated by electric power; but any such mechanism should have the advantages of the mechanism just described—that is, of turning on the current gradually when the cams are separated, so as to get up speed of the armature before the cams are moved into engagement, making it possible to use a less powerful and lighter motor than would be required to start a rock-drill at once with the cams in engagement. It is also convenient to effect this by a single crank and connections timed to operate at the proper time similar to those here described.

*Base-plate.*—The complete rock-drill is supported on a suitable base-plate to give a low center of gravity without increasing the width of the case by which stability is obtained, and the entire drill may be swung on the base-plate to one side or the other to remove the bit without disarranging the alinement. The construction and use of the base-plate 100 are best shown in Figs. VI, XII, and XIII. This base-plate is provided on each side with two arms 96 96, having at their upper ends curved lugs 97 97, adapted to fit and receive the main case when swung to one side or the other and acting as a stop therefor when swung clear of the bit in the hole. To the arms are fitted the bolts 98, engaging with the ears 99 on the main case, securing it firmly in position, and 101 is a single nut in the flat base for securing the rock-drill in position on a bolt, on a tripod, or other suitable support. The nut may have a collar 102 to prevent removal and loss. When the drill is in operation and it is desired to remove the bit, as for the purpose of substituting a longer one, the bit-nut is first loosened and drill-shell is then fed back, withdrawing the chuck from the bit and leaving the latter in the hole. The two bolts 98 98 on one side are withdrawn. The complete rock-drill, tilted to one side or the other into the position shown in Fig. XI, clears the bit in the hole, which is then withdrawn therefrom and replaced with a new or longer bit. The rock-drill is then turned to position. The bolts 98 98 are replaced, securing the drill to its base-plate. The chuck is then turned to clamping position to engage the bit, and the bit-nut is then tightened. By this arrangement the base-plate remains fixed and the bit is easily removed and replaced without danger of disarranging the alinement, the complete rock-drill being swung back on the base-plate necessarily into true alinement. With our base-plate the drill may be swung in one direction or the other, which may be necessary in case of a side breast or wall. In Fig. VI are shown handles 103 103 on each side for moving the complete drill. On one side they are shown in idle position and on the other raised against the stops 104.

*Double drill.*—Without substantial change by simple modification in the arrangement of parts and by adding suitable connections, shafts, and pinions two drills may be combined with one motor and operated thereby without greatly increasing the size of the double rock-drill or the operating power. Such an arrangement is shown in Figs. XIV to XVIII, practically diagrams indicating sufficiently the arrangement of parts and connections where the motor-case A is arranged between the integral extensions or hoods J J on each side, provided with ways K K for the drill-shells, which are fed forward therein, carrying the bits, rams, operating-cams, &c. 11 is the tubular armature-shaft carrying pinion X', meshing with intermediate pinion 75 75 and 76 76, by which, through shafts 77 77 and tubular telescoping shafts 78 78 and pinion 17, keyed thereto, the driving-cam shell and driving-shell are rotated. As here shown, the extensions J are arranged on each side of the motor-case, and the drill-shells arranged therein are brought back nearly to the rear of the motor-case, by which the length of the complete rock-drill is less than that of the single drill, though it is necessarily widened to receive the duplicate parts for sustaining and operating the rams and bits. The pinion X' is then secured on the rear of the motor to a single solid armature-shaft instead of to the front of the motor, and shafts 77 77 and 78 78 correspond to shafts 11 and 15 in the single drill, intermediate connections being arranged between gear 17 and driving-shell. In these figures is indicated an arrangement of parts by which the driving-cam is fed forward and the motor started by either one of the drill-handles, and when the length of the stroke has been adjusted the drills fed independently, each by its own handle or both together by either handle. This double rock-drill is shown supported on a quarry-bar of usual construction, having a rack and adjusted thereon by handle 81. The feed-screws L L are rearwardly extended, affording bearings for the cranks F F and their tubular shaft 40 40 and gears 41 41, having the crank-clutches 82 82, which may be moved inwardly to engage with screw-clutches 83 83 on the screw-gears 63 63, secured on feed-screws with which mesh gears 84 84 on corresponding counter-shafts 85 85, which may be connected to rotate together by clutch member 86, keyed fast on the counter-shaft, and clutch member 87 to slide on the other and moved into and out of engagement by lever 88 engaging in groove 89. When counter-shaft clutches are out of engagement, either drill may be fed without feeding the other, or both drills may be fed simultaneously, but independently, by their respective cranks and at different rates, if desired. By the engagement of these counter-shaft clutches the two drills may be fed together uniformly by either crank. When the cranks are moved into their out position, their gears 41 41 engage with gears 90 90 on vertical shafts 91 91, having double bevel-gears 92 92 on their lower ends, with which engage bevel-gears 45 45 on solid shafts 46 46, connected by telescoping shafts 47 47, by which through gears 49 49 and through connections the cams are separated before the motor is started, and the engagement of the cams therefore regulated. Cross-shaft 93, parallel to counter-shaft 85 85, has beveled gears 94 94, meshing with gears 92 92, and a central gear 95 to engage with the fiber-gear $a$ to operate the switch $k$ through clutch-collar $c$ and pawl $d$ to turn on the current after the cams have been separated, exactly as hereinbefore described in the single drill.

To arrange the connections to operate the bits alternately is better than to operate them simultaneously, requiring less total power and current.

*Characteristics.*—We are aware that it has been proposed to combine an electric motor and a rock-drill, but with direct connections or with ram and other parts reciprocating through the magnets, thus disarranging the electrical and mechanical action of the motor and rendering it necessary to feed the motor and drill together on extended supports. In our device the motor and drill are combined and inclosed in one case, making a single compact comparatively light rock-drill, easy to transport and arrange in position, in which all the parts are inclosed and protected from injury and damp, and motor and drill are so separated, being connected by variable shafts and indirect operative connections with the connections and reciprocating parts entirely outside of the motor, that the motor cannot be injured mechanically by vibration or shock from the drill tending to jar armature and coils, shake out the insulation, &c., nor disturbed electrically, causing heating, variation in lines of force, and in power. At the same time the motor and main case remain stationary, while the drill is fed independently in the extension without substantial change in the center of gravity and without the use of a heavy and clumsy auxiliary standard with long guideways, making our complete rock-drill simple, compact, and stable. The current, adjustment of cams, and feed are all controlled and operated by a single crank and without stopping the drill. The length of the stroke may be quickly and easily changed, necessary in seamy and conglomerate rock. The stroke may be varied from the shortest to full stroke by smallest variations and easily and gradually varied to get correct length of stroke, and at any length of stroke the rotation of bit is positively and independently effected to present the cutting edge of the bit in a new position to the rock at each stroke. By the base-plate the complete rock-drill is supported solidly with a low center of gravity and easy removal and renewal of bit is permitted. It is simple and economical to make and operate. It is easy to assemble and disassemble. A compact mechanism for controlling the current is provided. The case and housing are substantially cylindrical, so as to be easily made, turned, and finished. While our rock-drill is particularly devised to be used with an electric motor, which is generally more convenient, the power being supplied from a distance by ordinary wires, yet other power may be substituted where desired without substantial change in the parts of the drill.

What we claim as our invention, and desire to secure by Letters Patent, is—

1. In a percussive rock-drill, the combination of a suitable support, a motor thereon sustained in a fixed position, an extension on the support provided with ways, drilling mechanism fitted on the ways, a percussion-spring, intermediate variable connections between the motor and the drilling mechanism, to retract the drill against the force of the spring, and means feeding the drilling mechanism independently of the motor.

2. In a percussive rock-drill, the combination of a suitable support provided with ways, an electric motor on the support, percussive drilling mechanism fitted on the ways, a percussion-spring, intermediate variable connections between the armature of the motor and the drilling mechanism, to retract the drill against the force of the spring, said drilling mechanism and intermediate connections being arranged outside of the motor, and means feeding the drilling mechanism independently of the motor, while the motor maintains a constant position on the support.

3. In a rock-drill, the combination of a cylindrical case, a motor arranged within the case, an extension on the case provided with ways, a drilling mechanism fitted to the ways, variable connections between the motor and the drilling mechanism, said connections having a sliding step-by-step movement to operate the drilling mechanism at different distances from the motor as said mechanism is fed, and means feeding the drilling mechanism step by step on the ways independently of the motor.

4. In a rock-drill, the combination of a suitable support, a motor arranged on the support, an extension on the support provided with ways, a drill-shell fitted to the ways, drilling mechanism arranged in the drill-shell, variable operative connections between the motor and the drilling mechanism, and means for feeding the drill-shell on the ways independently of the motor, while the motor maintains a constant position on the support.

5. In a rock-drill, the combination of a suitable inclosing case, a motor arranged in a chamber within the case, a drilling mechanism fitted in ways in said case, a percussion-spring, variable operative connections between the motor and the drilling mechanism for retracting the drill against the force of the spring, and means feeding the drilling mechanism on the ways at varying distances from the motor.

6. In a rock-drill, the combination of an integral support, an electric motor arranged therein having an armature and armature-shaft suitably journaled in the support, an extension on the support provided with ways, a drilling mechanism fitted to move on said ways, variable operative connections between the armature-shaft and the drilling mechanism, said connections being arranged outside of the motor, and means feeding the drilling mechanism forward step by step on the ways parallel to the armature-shaft, to operate at varying distances from the motor, while the motor maintains a constant position on the support.

7. In a rock-drill, the combination of an electric motor having an armature-shaft suitably journaled in the support, a percussive drilling mechanism carrying the ram and bit, variable, operative connections between the armature-shaft and the drilling mechanism, means for feeding the drilling mechanism while the motor remains in constant position, the ram and bit being arranged to operate parallel to the armature-shaft, and a single suitable support for the motor and drilling mechanism.

8. In a rock-drill, the combination of an integral supporting-case, an electric motor arranged therein having an armature and armature-shaft suitably journaled in the case, an integral extension on the support provided with ways, a percussive drilling mechanism carrying the bit, said mechanism being arranged in said extension and fitted to move in the ways at varying distances from the motor, variable, operative connections between the armature-shaft and the drilling mechanism to retract the bit and attached parts, and means to feed the drilling mechanism on the ways, while the motor maintains a constant position in the case, the parts being so arranged that the movement of the bit and attached parts and the feed of the drilling mechanism are parallel to the armature-shaft.

9. In a rock-drill, the combination of a suitable case, a motor supported therein, a drilling mechanism fitted in ways on the case, variable connections between the motor and drilling mechanism, and means for rotating the drill through an arc of constant length at each stroke, independently of the length of the stroke.

10. In a rock-drill, the combination of a suitable case, a motor supported therein, a drilling mechanism fitted in ways on the case, variable connections between the motor and drilling mechanism, means for rotating the drill through an arc of constant length at each stroke independently of the length of the stroke, and means for feeding the drill independently of the motor.

11. In a rock-drill, the combination of a suitable inclosing case, a rotary motor journaled in the case in a fixed position, a drill, mechanism for effecting percussive reciprocation of the drill, said mechanism being supported entirely outside of the motor and independently thereof, a percussion-spring, variable sliding connections between the drill and motor to retract the drill against the force of the spring, and means feeding the drill and said mechanism independently of the motor.

12. In a rock-drill, the combination of a case provided with ways, an electric motor in the case, an armature-shaft journaled in the case, a main shaft connected to rotate with the armature-shaft, percussive drilling mechanism fitted to said ways, intermediate connections between the main shaft and the drilling mechanism, said drilling mechanism and intermediate connections being entirely outside of the motor, and means for feeding the drilling mechanism independently of the motor.

13. In a rock-drill, the combination of a case provided with ways, an electric motor in the case, an armature-shaft, a main shaft telescopically connected to the armature-shaft and rotating therewith, percussive drilling mechanism fitted to said ways, intermediate connections between the main shaft and the drilling mechanism, said drilling mechanism and intermediate connections being arranged entirely outside of the motor, and means for feeding the drilling mechanism independently of the motor.

14. The combination in a rock-drill, of a main case provided with ways, a motor arranged in the case, the drill, mechanism to operate percussively the drill, consisting of a ram, ram-cam, mainspring and driving-cam, suitably supported and fitted to the ways, variable connections between the motor and driving-cam, means to feed the drill and said percussive mechanism on the ways independently of the motor, means to regulate the distance between the cams and means for turning on the power.

15. In a rock-drill, the combination of a suitable case, a motor supported therein, a drilling mechanism fitted in ways on the case, said mechanism consisting of a drill, a ram-cam, a mainspring and driving-cam, suitable connections between the motor and drilling mechanism, and a single crank and connections for separating the cams and turning on the power.

16. In a rock-drill, the combination of a suitable case, a motor supported therein, a drilling mechanism consisting of a drill, a ram-cam, a mainspring and driving-cam, suitable connections between the motor and drilling mechanism, a single crank and connections for separating the cams, turning on the power, and bringing together the cams and separate connections for feeding the drill independently of the motor.

17. The combination in a rock-drill, of a main case provided with ways, a motor supported in the case, a drill-shell fitted to said ways, a ram, ram-cam, bit and mainspring suitably supported in the drill-shell, a driving-cam also supported in the drill-shell and engaging with the ram-cam, variable connections between the motor and driving-cam, a single crank adapted to be arranged in different positions, connections between the crank in one position and driving-cam to separate the cams, means operated by the crank in the same position to turn on the power, and connections between the crank in a second position and the drill-shell to feed said shell and the parts supported therein.

18. In combination in a rock-drill, a substantially cylindrical main case, an electric motor arranged therein, a tubular armature-shaft journaled in the case carrying the armature, a driving-shaft connected to the armature-shaft to rotate therewith but capable of independent longitudinal movement, an extension on the case, a drill-shell fitting the extension, the bit and mechanism to effect percussive reciprocation thereof and attached parts arranged in the shell, rotating connections between the driving-shaft and said mechanism, and means for feeding said drill-shell on said extension toward and from the motor without changing the position of the motor.

19. In combination in a rock-drill, a main case, a motor journaled therein, an extension on the case having ways, a drill-shell fitted to reciprocate in said ways; mechanism arranged in the drill-shell to effect the blow of the bit, said mechanism consisting of the bit, ram, ram-cam, and mainspring; a driving-cam also in the drill-shell and engaging with the ram-cam, variable connections between the motor and driving-cam to rotate the driving-cam to retract the bit, and means to reciprocate the drill-shell and inclosed parts independently of the motor.

20. In combination in a rock-drill, a case, an electric motor arranged therein, a tubular shaft suitably journaled in the case and carrying the armature, an integral extension on the case, a drill-shell fitted to move on ways in said extension, a bit arranged to reciprocate percussively in the drill-shell, variable connections between the armature-shaft and the bit to operate the bit and to transform the rotary motion of the motor into the reciprocating motion of the bit, said mechanism consisting of a ram, a mainspring engaging therewith, a ram-cam on the ram, a ram-cam shell rotatably connected to the ram-cam, a driving-cam engaging with the ram-cam, a driving-cam shell rotatably connected to the driving-cam, a gear on the driving-cam shell, a driving-shaft rotatably connected to the armature-shaft, and intermediate pinions connecting the driving-cam shell to rotate with the driving-shaft.

21. The combination, in a rock-drill, of an inclosing case, an electric motor arranged therein, an extension on the case, a bit and mechanism arranged in the extension to percussively reciprocate the bit and its attached parts, a percussion-spring, and variable sliding connections between the motor and said mechanism to retract the drill against the force of the spring, all of said reciprocating parts being arranged outside of the motor.

22. In combination in a rock-drill, a main case, an electric motor arranged therein having the armature supported on a tubular shaft suitably journaled in the case, said tubular shaft, a driving-shaft connected to the armature-shaft to rotate therewith but capable of independent, longitudinal movement, an integral extension on the case, a bit, a ram and ram-cam arranged percussively to reciprocate in the extension and entirely outside of the motor, a rotating driving-cam to retract the ram-cam and attached parts, and intermediate variable connections between the driving-shaft and driving-cam to rotate the driving-cam.

23. In combination in a rock-drill, a main case suitably supported having an integral extension, a rotary motor journaled in the main case, a drill-shell fitted to ways in said extension, a ram, a bit, a spring or springs, a ram-cam and a driving-cam carried in the drill-shell, variable connections between the motor and the driving-cam, means for rotating the bit through an arc of constant length at each stroke independently of the length of the stroke, and means for feeding the drill-shell in the extension independently of the motor.

24. In combination in a rock-drill, a main case, an integral extension thereon, a motor arranged in the case, a drill-shell fitted to the extension; a bit, a ram-cam, mainspring and driving-cam arranged in the drill-shell, means to feed the drill-shell in the extension independently of the motor, variable connections between the motor and the driving-cam, and means to regulate the distance between the cams.

25. In combination in a rock-drill, a main case, an integral extension thereon, a motor arranged in the case, a drill-shell fitted to the extension, a bit, ram, ram-cam, and mainspring and driving-cam arranged in the drill-shell, means to feed the drill-shell in the extension independently of the motor, variable connections between the motor and the driving-cam, means to regulate the distance between the cams, to regulate the length of stroke, without stopping the drill, and means to rotate the bit and attached parts a fixed distance at each stroke, independently of the length of stroke.

26. In combination in a rock-drill, a substantially cylindrical case suitably supported having extensions, a rotary motor journaled on a tubular shaft in the case, drill-shells fitted to ways in the extensions, a ram, a ram-cam, a bit, an operating spring or springs and a driving-cam carried in each drill-shell and variable connections between the motor-shaft and the driving-cams.

27. In combination in a rock-drill, a case, an electric motor arranged therein, a suitable switching mechanism to turn on the current; an integral extension on the case, a drill-shell fitted to ways in the extension; a ram, bit and mainspring in the shell, a ram-cam on the ram, a ram-cam shell rotatably connected to the ram-cam; a driving-cam and a driving-cam shell rotatably connected; a retracting-shell fitted within the drill-shell, means connecting the driving-cam to move longitudinally with the retracting-shell; variable connections between the armature-shaft and the driving-cam shell; a single crank adapted to be arranged at will in one of two positions, connections between the crank in one position and the retracting-shell to vary the distance between the cams, other connections between the crank in the same position and the switching mechanism to turn on the current after the cams have been separated, and connections between the crank in the second position and the feed-screw to feed the drill.

28. In combination in a rock-drill, a suitable case, an electric motor arranged therein, a tubular shaft journaled therein carrying the armature, an integral extension on the case, a drill-shell fitted to ways in the extension, a ram, bit, and mainspring inclosed in the drill-shell, a ram-cam on the ram, a ram-cam shell rotatably connected to the ram-cam, a driving-cam, a driving-cam shell rotatably connected to the driving-cam, a retracting-shell threaded to fit within the drill-shell, means connecting the driving-cam to move longitudinally with the retracting-shell, means for moving the retracting-shell longitudinally to vary the distance between the cams, means for rotating the bit and ram independently of the length of the stroke, variable connections between the armature-shaft and the driving-cam shell, and means to feed the drill-shell with inclosed parts while the rock-drill is in operation.

29. In combination in a rock-drill, a substantially cylindrical case, an electric motor arranged therein, having an armature-shaft journaled in the case, an integral extension on the case, a drill-shell fitted to ways therein, a ram, bit and mainspring in said shell, a ram-cam on the ram, a ram-cam shell rotatably connected to the ram-cam, a driving-cam and a driving-cam shell rotatably connected thereto, a retracting-shell to fit within the drill-shell and connected to the driving-cam to move the driving-cam longitudinally, means for rotating the bit and ram independently of the length of the stroke, variable connections between the armature-shaft and driving-cam shell, a single crank, one set of connecting-shafts and gears between the crank and the retracting-shell to vary the distance between the cams, a feed-screw mounted in the case and connected to the drill-shell, and a second set of connections between the crank and the feed-screw to reciprocate the drill-shell on the ways.

30. In combination in a rock-drill, a substantially cylindrical case, an electric motor arranged therein, a shaft suitably journaled for the armature, an integral extension on the case, a drill-shell fitted to ways therein, a ram, bit and mainspring in the shell, a ram-cam on the ram, a ram-cam shell rotatably connected to the ram-cam, a driving-cam and a driving-cam shell rotatably connected thereto, a retracting-shell to fit within the drill-shell, means connecting the driving-cam to move longitudinally with the retracting-shell, means rotating the bit and ram independently of the length of the stroke, variable connections between the armature-shaft and the driving-cam shell, a single crank adapted to be arranged in one of two positions and locked in either position at will, connections between the crank in one position and the retracting-shell to vary the distance between the cams, a feed-screw journaled in the extension and connected to the drill-shell, and a second set of connections between the crank in the second position and the feed-screw to feed the shell.

31. In combination in a rock-drill, a substantially cylindrical case, an electric motor arranged therein, a tubular shaft suitably journaled for the armature, an integral extension on the case, a drill-shell fitted to ways in the extension, a ram, bit and mainspring in said shell, a ram-cam, on the ram, a ram-cam shell rotatably connected to the ram-cam, a driving-cam and a driving-cam shell rotatably connected thereto, a retracting-shell fitting within the drill-shell and connected to move the driving-cam longitudinally, means to rotatably shift the bit and ram independently of the length of the stroke, means for moving the retracting-shell to vary the distance between the cams, means for feeding the drill-shell and the bit, means for rotating the bit a fixed distance at each stroke independently of the length of the stroke, variable connections between the armature-shaft and driving-cam shell consisting of a telescoping shaft rotatably connected to the tubular armature-shaft, a gear on said telescoping shaft, a gear on the exterior of the driving-cam shell, and an intermediate gear suitably journaled in the drill-shell and meshing with said shaft-gear and said driving-shell gear.

32. In combination in a rock-drill, a substantially cylindrical main case, an electric motor arranged therein, a tubular armature-shaft journaled therein carrying the armature of the motor; an integral extension on the case formed with ways, a drill-shell fitted to said ways, a rear plate to the drill-shell and a hollow nut screwed to its front end, a ram, a chuck, and a bit secured on the ram, a hollow flanged collar secured on the ram adjacent to the chuck and fitting within the hollow nut; a buffer-spring arranged between said flanged collar and the nut; an abutment in the drill-shell, a mainspring arranged around the ram between said abutment and the hollow collar; a ram-cam on the rear end of the ram, a ram-cam shell, a feather connecting the ram-cam and its shell to rotate together but to reciprocate independently; a driving-cam and a driving-cam shell, a feather connecting the driving-cam and its shell to rotate together but to reciprocate independently; a retracting-shell threaded to fit within the drill-shell, to be moved longitudinally therein, a shank and nut connecting the driving-cam to reciprocate with said retracting-shell, a gear on the retracting-shell; a gear on the driving-cam shell, a driving-shaft connected to rotate with the tubular armature-shaft and to slide longitudinally therein, a gear on the driving-shaft, an intermediate pinion meshing with said driving-shaft gear and the driving-cam-shell gear; a feed-screw journaled in the extension, an integral nut on the drill-shell engaging with the feed-screw, and a feed-screw gear on the feed-screw; an extension on the rear of the main shell inclosing connections for the line-wires, and a suitable switch for gradually turning on the current; a stud arranged in said chamber formed with two grooves, a tubular crank-shaft journaled and sliding on said stud, a gear on the inner end of said crank-shaft, and a crank on its outer end, a latch on said crank adapted to engage with the stud-grooves and to lock the crank and gear in out or in position at will; a solid shaft journaled in the lower portion of the case, a rear gear thereon to engage with crank-gear in its out-position, a telescoping shaft, an intermediate pinion meshing with said front gear and the retracting-shell gear; a tubular shaft inclosing said solid and telescoping shafts, a rear gear on said tubular shaft to engage with the crank-gear in its in position, a front gear on said tubular shaft, intermediate pinions between said front gear and said feed-screw gear, and connections between the crank-shaft gear in its out position and the switch gradually to turn on the current, substantially as shown and described.

33. In a percussive rock-drill means for turning the bit through an arc of constant length at each stroke independently of the length of the stroke, having in combination a suitable inclosing shell, a driving-cam and driving-cam shell, a connection between said cam and shell by which they are connected to rotate together but free to reciprocate independently, means for rotating said shell, a bit, ram, ram-cam, ram-cam shell and mainspring also inclosed in the inclosing shell; a connection between said ram-cam and its shell whereby they are connected to rotate together but to reciprocate independently, abutments on said shells engaging at each rotation and forcing the ram-cam shell rearwardly, a spring tending to force said ram-cam shell forward, said ram-cam shell being formed with a continuous circumferential series of inclines, and substantially fixed projections within the case engaging with said inclines when ram-cam shell is forced rearwardly.

34. In combination in a percussive rock-drill, a main case, a motor inclosed therein, an extension on the case formed with ways, a drill-shell fitted to said ways, a bit, ram and spring, a main driving-cam and driving-cam shell, a main ram-cam and ram-cam shell inclosed in the drill-shell, connections between each main cam and its shell whereby the respective cams and shells rotate together but are free to reciprocate independently, variable connections between the motor and the driving-cam shell, small cams on the adjacent edges of the cam-shells having each an inclined edge and flat face engaging at each rotation of the driving-cam shell and arranged to disengage at the point of disengagement of the main cams, said ram-cam shell being formed toward the rear with a circumferential series of short inclines of equal length, substantially fixed abutments in the driving-shell to engage with said inclines when the ram-cam shell is forced rearwardly, and a spring or springs to force said ram-cam shell forwardly, whereby the bit is turned through an arc of fixed length at each stroke independently of the length of the stroke.

35. In a percussive rock-drill, a main case and suitable supports, a motor, a driving-cam and driving-cam shell connected to rotate together, but reciprocating independently, connections between the motor and the driving-cam to rotate said cam; a bit, a ram, a ram-cam and mainspring, a ram-cam shell connected to the ram-cam to rotate therewith but to reciprocate independently; and means rotatably to shift the ram-cam, ram, and bit a constant distance at each stroke independently of the length of the stroke, having in combination small cams on the cam-shells adapted to engage at each rotation of the driving-cam shell; a circumferential series of inclined teeth on the ram-cam shell extending rearwardly, a shifting shell having corresponding teeth reversely arranged and adapted to engage with said ram-cam-shell teeth when the ram-cam shell is forced rearwardly by the engagement of the small cams, fixed studs to engage with short slots on the rear of the shifting shell permitting said shifting shell to be turned a short distance by the engagement of the ram-cam shell, and a spring to return the shifting shell to normal position when out of engagement with the ram-cam shell.

36. In combination in a rock-drill a substantially cylindrical case, a motor and drill inclosed therein, pairs of integral perforated ears correspondingly arranged on the lower portion of the case, one pair on each side, a base-plate having pairs of forwardly-extending perforated arms corresponding to said ears, and removable bolts for connecting the ears to their respective arms, whereby the entire case with the inclosed motor and drill may be rocked to one side or the other and returned positively to operative position.

37. In combination in a rock-drill, a cylindrical case having a forward extension, a motor and drill inclosed respectively in the case and extension, pairs of integral, perforated ears arranged one pair on each side of the lower portion of the case, a supporting base-plate having a substantially flat base and pairs of forwardly-extending perforated arms arranged one pair on each side corresponding to said ears, and on the upper ends of said arms outwardly-extending lugs having curved upper surfaces fitted to receive and sustain the case when swung from one side to the other and acting as stops to limit its motion after it has been swung clear of the detached bit in the hole, and removable bolts for connecting each ear to the corresponding base-plate arm, whereby the entire case with the inclosed motor and drill may be rocked to one side or the other and returned positively to operative position.

38. In combination in a rock-drill, a suitable case, a driving-cam journaled therein, a ball-bearing for the driving-cam, means for rotating the driving-cam, a bit, a ram and a ram-cam secured to the ram and engaging with the driving-cam, an abutment in the inclosing shell, an abutment on the ram, a main operating-spring arranged between said abutments, and a ball-bearing or ball-bearings on said abutments for the mainspring.

39. In combination in a rock-drill, a substantially cylindrical case, a motor inclosed therein, integral extensions on each side having ways for the drill elements, a drill-shell arranged in each extension and movable longitudinally on the ways; a ram, bit, mechanism for effecting percussive rotation thereof, mainspring, ram-cam and driving-cam arranged in each drill-shell, variable connections between the motor and each driving-cam; two cranks suitably journaled on the rear of the case and adjustable each in two positions, connections between both cranks in one position and the driving-cams to vary the distance between the cams, and other connections between both cranks and an electric switch mechanism to turn on the current when the cams are separated; feed-screws suitably supported, and connections between said feed-screws and their respective drill-shells to feed the drill elements, connections between each crank in its second position and the corresponding feed-screw to operate the screw, and adjustable connections between said cranks whereby each shell may be fed independently, by its own crank or both shells fed together by either crank.

40. In combination in a rock-drill, a main case, an electric motor arranged therein, a suitable shaft for the armature, an extension on the case, a drill-shell arranged to be fed in said extension, a reciprocating ram, a bit and ram-cam secured to the ram, a mainspring, mechanism to retract the ram, bit and ram-cam against the spring, a driving-shaft keyed to rotate with the armature-shaft and free to move in and out thereon, indirect connections between said driving-shaft and said retracting mechanism consisting of suitable gearing, said reciprocating parts and indirect connections being entirely outside of motor and of main case.

In testimony whereof we have signed our names to this specification in the presence of two subscribing witnesses.

HENRY D. CRIPPEN.
    GEORGE WHITE.
    GEORGE S. MAXWELL.

Witnesses:
 ALFRED WILKINSON,
 CAROLINE L. CUE.